United States Patent [19]

Clark et al.

[11] Patent Number: 4,971,816

[45] Date of Patent: Nov. 20, 1990

[54] MULTICOMPONENT ICE CONFECTION PRODUCT

[75] Inventors: Helen P. Clark, Wellingborough; Christopher B. Holt, Pavenham, both of Great Britain

[73] Assignee: Unilever Patent Holdings B.V., Rotterdam, Netherlands

[21] Appl. No.: 311,857

[22] Filed: Feb. 17, 1989

[30] Foreign Application Priority Data

Feb. 17, 1988 [GB] United Kingdom ............. 8803608

[51] Int. Cl.$^5$ ............................................. A23G 9/00
[52] U.S. Cl. ............................. 426/101; 426/234; 426/241; 426/107; 426/249; 426/565
[58] Field of Search ............... 426/101, 234, 241, 243, 426/107, 569, 565, 249, 566, 567

[56] References Cited

U.S. PATENT DOCUMENTS

| | | | |
|---|---|---|---|
| 2,182,784 | 12/1939 | Bayer | 426/101 |
| 2,600,566 | 6/1952 | Moffett, Jr. | 426/234 |
| 2,714,070 | 7/1955 | Welch | 426/234 |
| 4,031,261 | 6/1977 | Durst | 426/569 |
| 4,737,372 | 4/1988 | Bender | 426/569 |
| 4,789,552 | 12/1988 | Speakman | 426/234 |
| 4,794,008 | 12/1988 | Schmidt | 426/107 |

*Primary Examiner*—Jeanette Hunter
*Attorney, Agent, or Firm*—Cushman, Darby & Cushman

[57] ABSTRACT

Multicomponent ice confection product. The main part of its outer surface being regularly curved and the surface separating two components being at least mainly concentric with respect to said outer surface; the dimensions and the electrical properties being such that on exposure to microwave radiation from a commercial household or catering heater the centre will be heated in excess of 25° C. while a more outwardly positioned layer is still frozen.

10 Claims, 1 Drawing Sheet

MULTICOMPONENT ICE CONFECTION PRODUCT

The invention relates to multicomponent ice confection products suitable for preparation for consumption using a microwave oven.

Ice confection desserts like ice cream with hot chocolate sauce or hot raspberry sauce are very popular but require considerable preparation effort. Various proposals have been made to facilitate their preparation such as by packing the components separately, enabling the sauce component to be heated separately. Also two compartment packages have been proposed for use in a microwave oven, the ice cream compartment being shielded.

Apart from relatively expensive packaging material being used these proposals still require pouring the hot sauce onto the frozen ice cream component, resulting in a messy and difficult to handle dessert.

The invention relates to an improved multicomponent ice confection product, devoid of the above shortcomings, this product having an outer surface being at least mainly regularly curved, the surface separating two components being at least mainly concentric with respect to the said outer surface and the dimensions and electrical properties being such that on exposure of the frozen confection to microwave energy of commercial household or catering microwave heaters an inner area will be heated to a temperature of at least 25° C. while an area further outwardly is still frozen.

In a preferred embodiment the central component is a sauce, e.g. chocolate, fruit or mint, and a layer surrounding this center is an ice confection material, coated or not with a usual couverture and/or particles such as chopped nuts, wafer crunches etc.

Other features and embodiments will be apparent from the following description, illustrated diagrammatically in the accompanying drawings.

Figure 1:
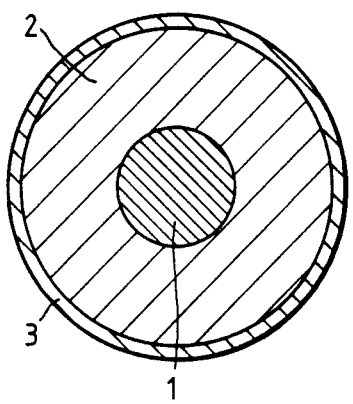
FIG. 1 is a cross section through one embodiment according to the invention.

In FIG. 1 a spherical ice confection product is shown in sectional view, comprising in a concentric arrangement a spherical center 1 of chocolate sauce, enclosed in a shell 2 of standard vanilla ice cream and a coating 3 of couverture. The expression "couverture" in this specification and claims refers to a fat based product which is solid at ambient temperature containing at least cocoa as a flavouring agent. Examples being chocolate, bakers, confectioners and ice makers couverture, comprising cocoa butter, cocoa butter substitutes, suitably hardened vegetable oils or fats and/or similar generally available fats or fat substitutes.

Examples of suitable ice creams and ice confection materials for the shell being:

|  | % by weight | |
| --- | --- | --- |
| milk fat | 14 | — |
| vegetable fat | — | 10 |
| msnf | 10 | 12 |
| sucrose | 15 | 12 |
| corn syrup solids | — | 5 |
| stabilizer/emulsifier | .3 | .3 |
| flavour | .1 | .1 |
| water up to | 100% | 100% |

Examples of chocolate and raspberry sauce being:

|  | % by weight |  | % by weight |
| --- | --- | --- | --- |
| cocoa | 11 | raspberry puree | 50 |
| milk fat | 10 | sucrose | 20 |
| msnf | 3 | dextrose | 10 |
| sucrose | 26 | glucose syrup | 9 |
| dextrose | 10 | starch | 4 |
| glucose syrup | 8 | water up to | 100% |
| starch | 3.7 | | |
| vanillin | .5 | | |
| salt | .3 | | |
| water up to | 100% | | |

In practice the diameter of the confection product is from 4.5 to 6 cm and preferably of about 5 cm, provided standard ice cream or ice confection having an overrun of from 0 to 80% and preferably of from 0 to 50% is used. The higher overrun values are to be accounted for by the higher diameters. Suitable dimensions for the center are diameters of from 1 to 2.5 cm, preferably about 1.5 cm.

Although these dimensions give good results with products as specified above, deviations will be possible. If for example higher overrun than say 80% is used a diameter of 6 to 8 cm is more suitable. Roughly the following equations apply:

$$R = \frac{\lambda_0 \, 4.5}{2\pi\epsilon}$$

where
R = radius of sphere in cm
$\lambda_o$ = incident wavelength
$\epsilon$ = dielectric constant (real part) and
$\epsilon_i$ = dielectric constant (imaginary part) of the product
$\lambda$ = wavelength in the product.

$$\lambda = \lambda_o(\epsilon^2 + \epsilon_i^2)^{-\frac{1}{2}}$$

The dielectric constant of the ice confection can be determined after its preparation.

By approximation the dielectric constant of ice confection can be calculated using the equation:

$$\epsilon = 3.01\Phi A + 6.53\Phi M + 3.12\Phi F + I$$

where
$\Phi A$ = phase volume of air
$\Phi M$ = phase volume of matrix
$\Phi_{F=I}$ = phase volume of fat and ice.
By matrix the aqueous phase of the ice confection is understood.

After putting the product having a temperature of about −18° C. into a commercial microwave oven of 1.3 kW and 2450 MHz the oven is energized for 35 secs on half power. This results in a sphere which is still hard frozen but has a molten, warm center.

Best results are obtained with ice confection material comprising from 0 to 15% by weight of fat and from 30 to 55% by weight of ice.

Figure 2:
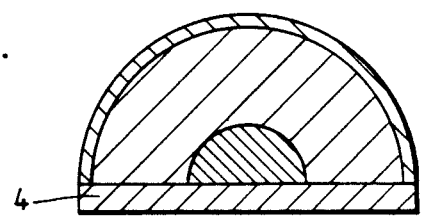
FIG. 2 is a cross section through another embodiment according to the invention.
Figure 3:
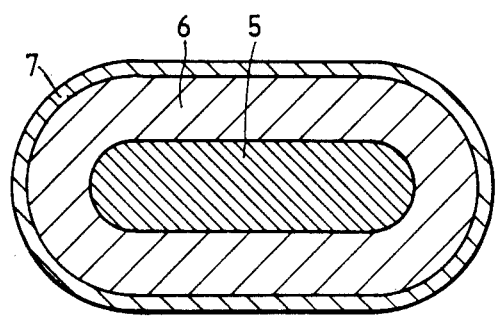
FIG. 3 is a longitudinal section through still another embodiment according to the invention.

In FIG. 2 a second embodiment of a product according to the invention is shown. A disc shaped sponge cake or biscuit base 4 having a thickness of about 0.5 cm supports a hemispherical composite product being roughly half the product as described in connection to FIG. 1. Similar ingredients and compositions can be used.

The cylindrical product having rounded ends comprises an oblong center 5 of sauce, enclosed by a layer 6 of ice confection material and a couverture coating 7. Since the concentration of the microwave energy when heating in a microwave oven is less expressed than with the globular embodiment a slightly longer exposure or more intense exposure to microwaves is to be used for preferentially heating the sauce.

If the same sauce is very fluid after heating it will flow across the cold ice confection and a plate supporting it and as a result quickly cool down again. For more expressed results and longer lasting temperature contrasts a suitable thickening agent is contained in the sauce, such as 3 to 7% by weight of starch. It will be evident for experts that any suitable thickening agent can be used.

We claim:

1. A multicomponent ice confection comprising in concentric arrangement in an inner area of sauce and an outer area of an ice confection,
   wherein the dimensions of the areas and the electrical properties of the components are such that on exposure of the confection to microwave energy of commercial, household or catering microwave heaters the inner area of sauce will be heated to a temperature of at least 25° C. while the outer area of ice confection remains frozen.

2. Multicomponent ice confection according to claim 1, which is a sphere having a radius R conforming to the equation:

$$R = \frac{\lambda_0 \, 4.5}{2\pi\epsilon}$$

where $\lambda_o$ = incident wavelength of the microwave energy
$\epsilon$ = dielectric constant (real part) and
$\epsilon_i$ = dielectric constant imaginary part) of the ice confection product
$\lambda$ = wavelength in the product $$\lambda = \lambda_o(\epsilon^2 + \epsilon_i^2)^{-1/2}$$

3. Multicomponent ice confection according to claim 2, wherein the sphere is of a diameter of from 4.5 to 6 cm.

4. Multicomponent ice confection according to claim 1, wherein the ice confection has an overrun of from 0 to 80%.

5. Multicomponent ice confection according to claim 1, wherein the ice confection comprises 0 to 15% by weight of fat and 30 to 55% by weight of ice.

6. Multicomponent ice confection according to claim 1, wherein the sauce contains a thickening agent.

7. Multicomponent ice confection according to claim 6, wherein the thickening agent contains from 3 to 7% by weight of starch.

8. Multicomponent ice confection according to claim 1, wherein the outer area of ice confection is coated with a couverture.

9. A multicomponent ice confection comprising in hemispherical arrangement an inner area of sauce and an outer area of an ice confection forming a hemispherical composite product which is attached to a disk-shaped sponge cake or biscuit base,
   wherein the dimensions of the areas and the electrical properties of the components are such that on exposure of the confection to microwave energy of commercial household or catering microwaver heaters the inner area of sauce will be heated to a temperature of at least 25° C. while the outer area of ice confection remains frozen.

10. Multicomponent ice confection according to claim 9, wherein the outer area of ice confection is coated with a couverture.

* * * * *